United States Patent
Taniguchi et al.

(10) Patent No.: US 12,491,796 B2
(45) Date of Patent: Dec. 9, 2025

(54) TRAVELING PROPRIETY DETERMINATION DEVICE

(71) Applicants: Hino Motors, Ltd., Tokyo (JP); TOYOTA JIDOSHA KABUSHIKI KAISHA, Toyota (JP)

(72) Inventors: Koichiro Taniguchi, Hino (JP); Jun Namima, Hino (JP)

(73) Assignees: Hino Motors, Ltd., Tokyo (JP); TOYOTA JIDOSHA KABUSHIKI KAISHA, Toyota (JP)

(*) Notice: Subject to any disclaimer, the term of this patent is extended or adjusted under 35 U.S.C. 154(b) by 91 days.

(21) Appl. No.: 18/604,570

(22) Filed: Mar. 14, 2024

(65) Prior Publication Data
US 2024/0308391 A1   Sep. 19, 2024

(30) Foreign Application Priority Data
Mar. 15, 2023 (JP) .............................. 2023-040645

(51) Int. Cl.
*B60L 58/31* (2019.01)
*B60L 58/40* (2019.01)

(52) U.S. Cl.
CPC ............ *B60L 58/31* (2019.02); *B60L 58/40* (2019.02); *B60L 2250/16* (2013.01)

(58) Field of Classification Search
None
See application file for complete search history.

(56) References Cited

U.S. PATENT DOCUMENTS

| | | | |
|---|---|---|---|
| 2002/0192519 A1 | 12/2002 | Fujita et al. | |
| 2004/0090195 A1* | 5/2004 | Motsenbocker | B60L 58/25 318/109 |
| 2007/0154756 A1 | 7/2007 | Fujita et al. | |
| 2007/0233334 A1* | 10/2007 | Kozarekar | B60K 6/445 701/22 |
| 2017/0246965 A1* | 8/2017 | Nakagawa | H01M 8/04686 |
| 2021/0101492 A1* | 4/2021 | Oya | H01M 16/006 |
| 2021/0237616 A1 | 8/2021 | Ichikawa | |

FOREIGN PATENT DOCUMENTS

| | | |
|---|---|---|
| JP | 2000-46587 A | 2/2000 |
| JP | 2001-229944 A | 8/2001 |
| JP | 2005-297962 A | 10/2005 |
| JP | 2008-218165 A | 9/2008 |

OTHER PUBLICATIONS

Extended European Search Report issued Sep. 2, 2024 in European Patent Application No. 24163632.3, 18 pages.

* cited by examiner

*Primary Examiner* — Daniel L Greene
(74) *Attorney, Agent, or Firm* — Oblon, McClelland, Maier & Neustadt, L.L.P.

(57) ABSTRACT

A state determination unit determines whether a state of traveling performance of a fuel cell vehicle is a normal performance state, a limited performance state, or a low performance state. When the state determination unit determines that the fuel cell vehicle is in the normal performance state or the limited performance state, a traveling propriety determination unit determines that the fuel cell vehicle can travel. A notification control unit performs a limited state notification when the state determination unit determines that the fuel cell vehicle is in the limited performance state and the traveling propriety determination unit determines that the fuel cell vehicle can travel.

6 Claims, 3 Drawing Sheets

Fig.2

| | | LOW PERFORMANCE STATE | LIMITED PERFORMANCE STATE | | NORMAL PERFORMANCE STATE |
|---|---|---|---|---|---|
| | | | SECOND LIMITED PERFORMANCE STATE | FIRST LIMITED PERFORMANCE STATE | |
| DRIVING PERFORMANCE | | LESS THAN LOW OUTPUT POWER VALUE | EQUAL TO OR MORE THAN LOW OUTPUT POWER VALUE | EQUAL TO OR MORE THAN MIDDLE OUTPUT POWER VALUE | EQUAL TO OR MORE THAN HIGH OUTPUT POWER VALUE |
| BRAKING PERFORMANCE | | LESS THAN LOW ABSORPTION POWER VALUE | EQUAL TO OR MORE THAN LOW ABSORPTION POWER VALUE | EQUAL TO OR MORE THAN MIDDLE ABSORPTION POWER VALUE | EQUAL TO OR MORE THAN HIGH ABSORPTION POWER VALUE |
| FUEL CELL NORMAL STATE | TRAVELING PROPRIETY | DISABLED | ENABLED | ENABLED | ENABLED |
| | LIMITED STATE NOTIFICATION | - | SECOND LIMITED PERFORMANCE STATE NOTIFICATION | FIRST LIMITED PERFORMANCE STATE NOTIFICATION | - |
| FUEL CELL ACTIVATION DELAY STATE | TRAVELING PROPRIETY | DISABLED | DISABLED | DISABLED | ENABLED |
| | LIMITED STATE NOTIFICATION | - | - | - | - |

TRAVELING PROPRIETY DETERMINATION DEVICE

CROSS-REFERENCE TO RELATED APPLICATIONS

This application is based upon and claims the benefit of priority from Japanese Patent Application No. 2023-040645, filed on Mar. 15, 2023, the entire contents of which are incorporated herein by reference.

BACKGROUND

Field

The present disclosure relates to a traveling propriety determination device that determines traveling propriety of a fuel cell vehicle.

There is a fuel cell vehicle including a motor operated by electric power of a battery or a fuel cell. Generally, the fuel cell takes time to be activated. Therefore, for example, Japanese Unexamined Patent Publication No. 2008-218165 describes a notification means for notifying that the fuel cell mounted on the fuel cell vehicle is in a state of being able to generate power at a predetermined output or more. In addition, Japanese Unexamined Patent Publication No. 2005-297962 describes displaying a state of the fuel cell.

SUMMARY

Here, the fuel cell vehicle can travel only on battery power even if the fuel cell is not generating power. In this case, depending on the fuel cell vehicle, it may not be possible to obtain sufficient output of the motor only by the battery power. When the fuel cell vehicle is caused to travel in such a state, there is a risk that traveling of surrounding vehicles may be hindered due to insufficient acceleration force of the fuel cell vehicle or the like.

Therefore, the present disclosure describes a traveling propriety determination device capable of more appropriately determining the traveling propriety of the fuel cell vehicle and notifying traveling performance of the fuel cell vehicle.

Means for Solving the Problems

A traveling propriety determination device according to an aspect of the present disclosure is [1] "a traveling propriety determination device that determines whether a fuel cell vehicle can travel in the fuel cell vehicle that travels by power of a power unit including a battery, a fuel cell, and a motor operated by electric power of at least one of the battery and the fuel cell, the traveling propriety determination device including: a state determination unit configured to determine, based on a state of the power unit, whether a state of traveling performance of the fuel cell vehicle that can be exhibited by the power unit is a predetermined normal performance state in which the fuel cell vehicle can normally travel, a limited performance state in which the traveling performance is lower than that in the normal performance state, or a low performance state in which the traveling performance is lower than that in the limited performance state; a traveling propriety determination unit configured to determine that the fuel cell vehicle can travel when the state determination unit determines that the fuel cell vehicle is in the normal performance state or the limited performance state; and a notification control unit configured to perform a limited state notification indicating that the traveling performance of the fuel cell vehicle is in a limited state through a notifier when the state determination unit determines that the fuel cell vehicle is in the limited performance state and the traveling propriety determination unit determines that the fuel cell vehicle can travel".

The traveling propriety determination device determines that the fuel cell vehicle can travel even in the limited performance state in which the traveling performance is lower than that in the normal performance state. Thus, for example, even in a state where activation of the fuel cell is not completed, the fuel cell vehicle can travel in anticipation of completion of the activation of the fuel cell. However, when the traveling propriety determination device determines that the fuel cell vehicle can travel in the limited performance state, the traveling propriety determination device performs the limited state notification indicating that the traveling performance is in the limited state through the notifier. Thus, a driver of the fuel cell vehicle can recognize that the fuel cell vehicle can travel but the traveling performance is in the limited state. Then, the driver can perform a driving operation according to limited traveling performance. In this manner, the traveling propriety determination device can more appropriately determine the traveling propriety of the fuel cell vehicle and notify the traveling performance of the fuel cell vehicle.

The traveling propriety determination device according to one aspect of the present disclosure may be [2] "the traveling propriety determination device according to the above [1], in which the limited performance state includes a first limited performance state and a second limited performance state in which the traveling performance is lower than that in the first limited performance state, the state determination unit determines whether the state of the traveling performance that can be exhibited by the power unit is the normal performance state, the first limited performance state, the second limited performance state, or the low performance state, the notification control unit performs a first limited state notification as the limited state notification through the notifier when the state determination unit determines that the fuel cell vehicle is in the first limited performance state and the traveling propriety determination unit determines that the fuel cell vehicle can travel, and the notification control unit performs, as the limited state notification, a second limited state notification indicating that the traveling performance of the fuel cell vehicle is lower than that of the first limited performance state through the notifier when the state determination unit determines that the fuel cell vehicle is in the second limited performance state and the traveling propriety determination unit determines that the fuel cell vehicle can travel". In this case, the traveling propriety determination device can perform the first limited state notification or the second limited state notification according to the traveling performance in the limited performance state even in the limited performance state. Thus, the driver can recognize how much the traveling performance is limited although the fuel cell vehicle can travel.

The traveling propriety determination device according to one aspect of the present disclosure may be [3] "the traveling propriety determination device according to the above [2], in which the second limited state notification is a notification indicating that the traveling performance of the fuel cell vehicle is in a more limited state than the first limited state notification in a more emphasized manner". In this case, the driver can easily distinguish and recognize the first limited state notification and the second limited state notification.

The traveling propriety determination device according to one aspect of the present disclosure may be [4] "the traveling propriety determination device according to any one of the above [1] to [3], in which the traveling performance is driving performance or braking performance of the fuel cell vehicle, or includes both the driving performance and the braking performance of the fuel cell vehicle, and the braking performance indicates power absorption performance when power generated by the motor when the motor is used as a regenerative brake is absorbed by at least one of the battery and a braking electric power absorption device mounted on the fuel cell vehicle". In this case, the traveling propriety determination device can determine the traveling propriety of the fuel cell vehicle based on the driving performance and/or the braking performance that can be exhibited by the power unit.

The traveling propriety determination device according to one aspect of the present disclosure may be [5] "the traveling propriety determination device according to any one of the above [1] to [4], in which when the traveling propriety determination unit determines that the fuel cell vehicle can travel, the notification control unit performs a travel enabled notification indicating that the fuel cell vehicle is in a travelable state through the notifier". In this case, the driver can easily recognize that the fuel cell vehicle is in the travelable state.

The traveling propriety determination device according to one aspect of the present disclosure may be [6] "the traveling propriety determination device according to any one of the above [1] to [5], in which the traveling propriety determination unit determines whether a state of the fuel cell is an activation delay state requiring a preset time or more for activating the fuel cell, and when the state of the fuel cell is the activation delay state, even if the state determination unit determines that the fuel cell vehicle is in the limited performance state, the traveling propriety determination unit does not determine that the fuel cell vehicle can travel". Thus, when the fuel cell is in the activation delay state, the traveling propriety determination device does not determine that the fuel cell vehicle can travel until the power unit is in the normal performance state. That is, the traveling propriety determination device does not determine that the fuel cell vehicle can travel, for example, in anticipation of the completion of the activation when the activation of the fuel cell is not completed. In this manner, the traveling propriety determination device can more appropriately determine the traveling propriety of the fuel cell vehicle based on the state of the fuel cell.

According to one aspect of the present disclosure, it is possible to more appropriately determine the traveling propriety of the fuel cell vehicle and to notify the traveling performance of the fuel cell vehicle.

BRIEF DESCRIPTION OF THE DRAWINGS

FIG. 2 is a table illustrating a relationship between each performance state of a power unit and driving performance and braking performance, and each performance state of the power unit and a notification example.

DETAILED DESCRIPTION

Figure 1:
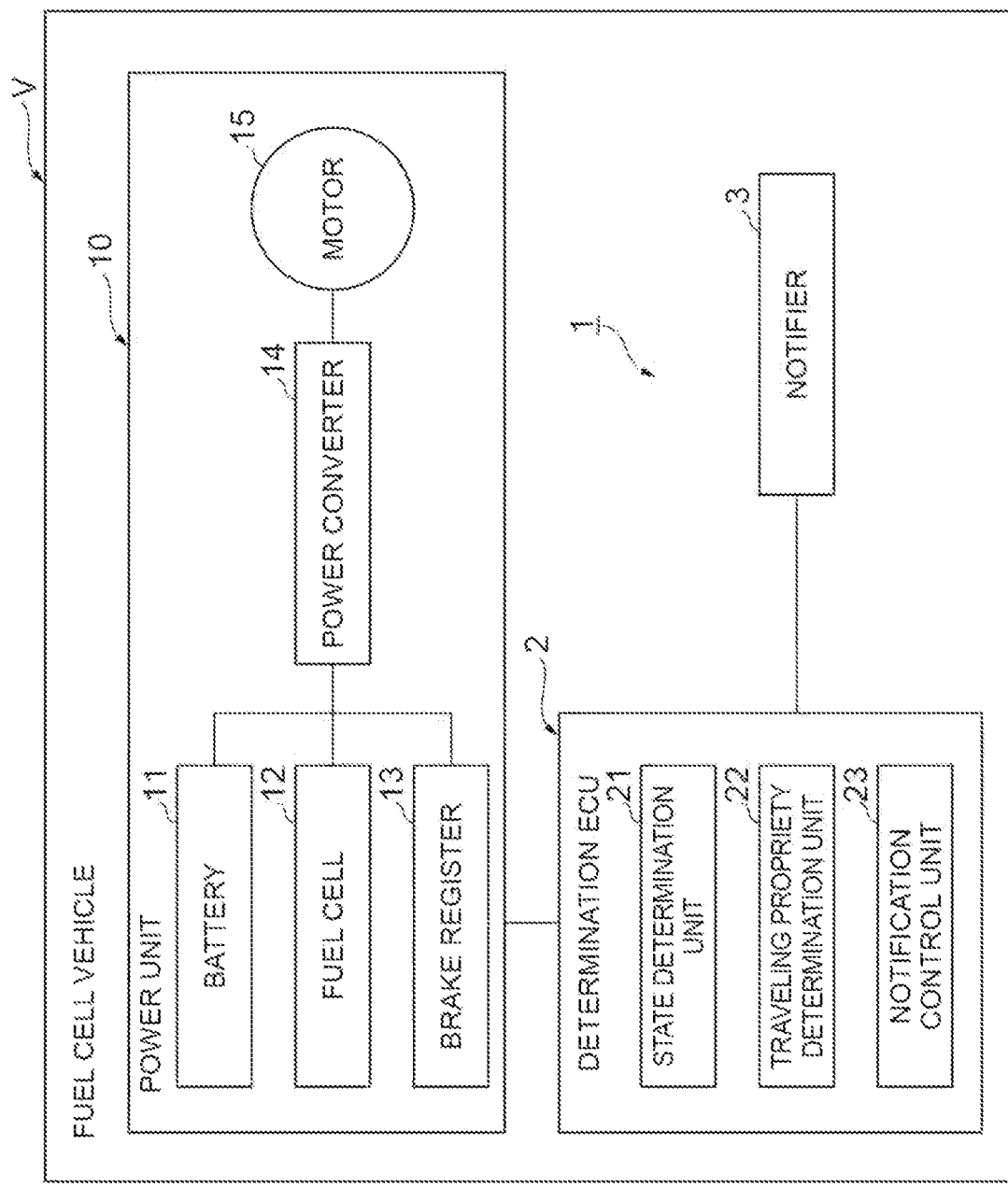
FIG. 1 is a block diagram illustrating an example of a fuel cell vehicle on which a traveling propriety determination device according to an embodiment is mounted.

Hereinafter, exemplary embodiments will be described with reference to the drawings. Note that in the drawings, the same or corresponding elements are denoted by the same reference numerals, and redundant description will be omitted.

A traveling propriety determination device 1 illustrated in FIG. 1 determines whether a fuel cell vehicle V can travel. This determination is made at the time of starting the fuel cell vehicle V (at the time of starting traveling). Here, the fuel cell vehicle V is equipped with a battery 11 and a fuel cell 12 as power sources. The fuel cell vehicle V travels by power of a power unit 10 including the battery 11 and the fuel cell 12. For example, the fuel cell vehicle V may be a large vehicle such as a commercial vehicle.

Specifically, the power unit 10 includes the battery 11, the fuel cell 12, a brake register (a braking electric power absorption device) 13, a power converter 14, and a motor 15. The power converter 14 converts electric power stored in the battery 11 and electric power generated by the fuel cell 12 into electric power suitable for driving the motor 15, and supplies the electric power to the motor 15. The motor 15 generates a rotational force by the supplied electric power to drive tires of the fuel cell vehicle V. The motor 15 is operated by the electric power of at least one of the battery 11 and the fuel cell 12.

Here, the motor 15 can be used as a regenerative brake for decelerating the fuel cell vehicle V. In this case, the power converter 14 converts the power generated by the motor 15 into the power suitable for charging the battery 11 and the power suitable for being supplied to the brake register 13, and supplies the powers respectively to the battery 11 and the brake register 13. The battery 11 is charged by the power supplied from the power converter 14. The brake register 13 consumes the power generated by the motor 15 when the motor 15 is used as the regenerative brake. Here, the brake register 13 consumes the power by converting the power supplied from the power converter 14 into heat. In this manner, the battery 11 and the brake register 13 absorb the power generated when the motor 15 is used as the regenerative brake.

The traveling propriety determination device 1 includes a determination electronic control unit (ECU) 2 and a notifier 3. The notifier 3 notifies a driver of the fuel cell vehicle V of various types of information. For example, the notifier 3 can display characters, pictures, and the like and/or output sound. For example, the notifier 3 may be a monitor provided on an instrument panel installed in a driver's seat of the fuel cell vehicle V. For example, notifier 3 may be a speaker installed around the driver's seat.

The determination ECU 2 is an electronic control unit including a central processing unit (CPU), a read only memory (ROM), a random access memory (RAM), and the like. For example, the determination ECU 2 implements various functions by, for example, loading a program stored in the ROM into the RAM and executing the program loaded in the RAM by the CPU. The determination ECU 2 functionally includes a state determination unit 21, a traveling propriety determination unit 22, and a notification control unit 23.

The state determination unit 21 determines a state of traveling performance of the fuel cell vehicle V that can be exhibited by the power unit 10 based on a state of the power unit 10. Here, the state determination unit 21 determines whether the state of the traveling performance that can be exhibited by the power unit 10 is a predetermined normal performance state in which the fuel cell vehicle V can normally travel, a limited performance state in which the traveling performance is lower than that in the normal performance state, or a low performance state in which the traveling performance is lower than that in the limited performance state.

Note that in the present embodiment, the limited performance state includes a first limited performance state and a second limited performance state in which the traveling performance is lower than that in the first limited performance state. When the state of the traveling performance that can be exhibited by the power unit 10 is the limited performance state, the state determination unit 21 further determines whether the state is the first limited performance state or the second limited performance state. That is, the state determination unit 21 determines whether the state of the traveling performance that can be exhibited by the power unit 10 is the normal performance state, the first limited performance state, the second limited performance state, or the low performance state.

Further, in the present embodiment, as an example, it is assumed that the power that can be supplied by the fuel cell 12 is larger than the power that can be supplied by the battery 11. Further, as an example, it is assumed that the fuel cell vehicle V can travel only by the power of the battery 11, but the state of the traveling performance that can be exhibited by the power unit 10 is below the normal performance state. That is, it is assumed that since the maximum output power of the battery 11 is small, the power unit 10 does not reach the normal performance state in which the fuel cell vehicle V can normally travel without using output power of the fuel cell 12. The power unit 10 is in the limited performance state in which the traveling performance is lower than that in the normal performance state only with output power of the battery 11. Further, for example, the power unit 10 is in the low performance state until activation of the battery 11 is completed. As described above, in the power unit 10, the activation of the battery 11 is completed, and then the activation of the fuel cell 12 is completed. Thus, as an example, the state of the power unit 10 changes in the order of the low performance state, the limited performance state, and the normal performance state.

Note that in the present embodiment, the traveling performance that can be exhibited by the power unit 10 includes both driving performance and braking performance of the fuel cell vehicle. The driving performance indicates performance when the motor 15 drives the fuel cell vehicle V. The braking performance indicates power absorption performance when the power generated by the motor 15 is absorbed by at least one of the battery 11 and the brake register 13 when the motor 15 is used as the regenerative brake.

Here, the normal performance state can be, for example, a state in which normal traveling can be performed on a general road and an expressway without hindering traveling of surrounding vehicles when the fuel cell vehicle V travels. For example, the driving performance when the power unit 10 is in the normal performance state may be driving performance that can be exhibited by an engine vehicle equivalent to the fuel cell vehicle V. For example, the braking performance when the power unit 10 is in the normal performance state may be predetermined braking performance capable of exerting a braking force stronger than the braking force by the engine brake that can be exerted by the engine vehicle equivalent to the fuel cell vehicle V.

That is, for example, the driving performance in the normal performance state can be defined as a case where a power value that can be supplied to the motor 15 is equal to or more than a predetermined high output power value. Further, for example, the braking performance in the normal performance state can be defined as a case where the power value that can be absorbed in the battery 11 and the brake register 13 is equal to or more than a predetermined high absorption power value. Note that the state determination unit 21 determines that the normal performance state is established when both the driving performance and the braking performance satisfy the above conditions.

The limited performance state can be, for example, a state in which the fuel cell vehicle V can travel although it does not reach the traveling performance in the normal performance state. In the limited performance state, the second limited performance state is a state in which the traveling performance that can be exhibited by the power unit 10 is lower than that in the first limited performance state.

For example, the driving performance in the first limited performance state can be defined as a case where the power value that can be supplied to the motor 15 is equal to or more than a predetermined middle output power value. Note that the middle output power value is set to a value lower than the high output power value. Further, for example, the braking performance in the first limited performance state can be defined as a case where the power value that can be absorbed in the battery 11 and the brake register 13 is equal to or more than a predetermined middle absorption power value. Note that the middle absorption power value is set to a value lower than the high absorption power value. Note that the state determination unit 21 determines that the first limited performance state is established when both the driving performance and the braking performance satisfy the above conditions.

For example, the driving performance in the second limited performance state can be defined as a case where the power value that can be supplied to the motor 15 is equal to or more than a predetermined low output power value. Note that the low output power value is set to a value lower than the middle output power value. Further, for example, the braking performance in the second limited performance state can be defined as a case where the power value that can be absorbed in the battery 11 and the brake register 13 is equal to or more than a predetermined low absorption power value. Note that the low absorption power value is set to a value lower than the middle absorption power value. Note that the state determination unit 21 determines that the second limited performance state is established when both the driving performance and the braking performance satisfy the above conditions.

However, the same absorption power value may be set for the braking performance in the first limited performance state and the braking performance in the second limited performance state. That is, the same value may be set as the low absorption power value and the middle absorption power value. Even in this case, since the driving performance in the second limited performance state is lower than the driving performance in the first limited state, the traveling performance in the second limited performance state is lower than that in the first limited performance state.

The low performance state can be, for example, a state in which the power unit 10 cannot exhibit sufficient performance for traveling the fuel cell vehicle V. For example, the low performance state may be a state in which the fuel cell vehicle V cannot travel or a state in which it cannot be regarded that the fuel cell vehicle V can travel. The low performance state is a state below the limited performance state. For example, the driving performance in the low performance state can be defined as a case where the power value that can be supplied to the motor 15 is less than the predetermined low output power value. Further, for example, the braking performance in the low performance state can be defined as a case where the power value that can be absorbed in the battery 11 and the brake register 13 is less than the predetermined low absorption power value.

As described above, the state determination unit 21 can determine each state such as the normal performance state based on the power value that can be supplied to the motor 15 and the power value that can be absorbed by the battery 11 and the brake register 13. Note that FIG. 2 illustrates a relationship between each performance state described above, and the driving performance and the braking performance.

When the state determination unit 21 determines that it is in the normal performance state or the limited performance state, the traveling propriety determination unit 22 determines that the fuel cell vehicle V can travel. On the other hand, when the state determination unit 21 determines that the fuel cell vehicle V is in the low performance state, the traveling propriety determination unit 22 determines that the fuel cell vehicle V cannot travel.

Note that in the present embodiment, the traveling propriety determination unit 22 further determines whether a state of the fuel cell 12 is an activation delay state that requires a preset time or more for activating the fuel cell 12. In general, the fuel cell 12 takes longer to complete the activation when a temperature of the fuel cell 12 is low than when the temperature is appropriate. For example, the traveling propriety determination unit 22 can determine whether the fuel cell 12 is in the activation delay state based on an outside temperature, the temperature of the fuel cell 12, or the like. Then, when the state of the fuel cell 12 is the activation delay state, the traveling propriety determination unit 22 does not determine that the fuel cell vehicle V can travel even if the state determination unit 21 determines that the fuel cell vehicle V is in the limited performance state. That is, when the state of the fuel cell 12 is the activation delay state, the traveling propriety determination unit 22 does not determine that the fuel cell vehicle V can travel until the state determination unit 21 determines that the fuel cell vehicle V is in the normal performance state.

The notification control unit 23 controls notification contents notified by the notifier 3. Here, when the traveling propriety determination unit 22 determines that the fuel cell vehicle V can travel, the notification control unit 23 performs a travel enabled notification indicating that the fuel cell vehicle V is in a travelable state through the notifier 3. The travel enabled notification can be performed by displaying the characters, the pictures, and the like and/or outputting the sound. As an example, the travel enabled notification may be performed by displaying the characters such as "READY".

Further, when the state determination unit 21 determines that the fuel cell vehicle V is in the limited performance state and the traveling propriety determination unit 22 determines that the fuel cell vehicle V can travel, the notification control unit 23 performs a limited state notification through the notifier 3 in addition to the travel enabled notification. The limited state notification is for notifying the driver that the traveling performance of the fuel cell vehicle V is in a limited state.

Here, as described above, the limited performance state includes the first limited performance state and the second limited performance state in which the traveling performance is lower than that in the first limited performance state. Therefore, when the state determination unit 21 determines that the fuel cell vehicle V is in the first limited performance state and the traveling propriety determination unit 22 determines that the fuel cell vehicle V can travel, the notification control unit 23 performs the first limited state notification as the limited state notification through the notifier 3 in addition to the travel enabled notification. The first limited state notification is a notification indicating that the state of the power unit 10 is the first limited performance state. The first limited state notification can be performed by displaying the characters, the pictures, and the like and/or outputting the sound (voice).

Note that the first limited state notification may be a mode in which a notification on the driving performance side indicating that the driving performance is in the first limited performance state and a notification on the braking performance side indicating that the braking performance is in the first limited performance state are separately notified. Further, as the first limited state notification, only one of the notification on the driving performance side indicating that the driving performance is in the first limited performance state and the notification on the braking performance side indicating that the braking performance is in the first limited performance state may be performed.

Further, when the state determination unit 21 determines that the fuel cell vehicle V is in the second limited performance state and the traveling propriety determination unit 22 determines that the fuel cell vehicle V can travel, the notification control unit 23 performs the second limited state notification as the limited state notification through the notifier 3 in addition to the travel enabled notification. The second limited state notification is a notification indicating that the traveling performance of the fuel cell vehicle V is lower than that of the first limited performance notification. Further, the second limited state notification is a notification indicating that the traveling performance of the fuel cell vehicle V is in a more limited state than the first limited state notification in a more emphasized manner. The second limited state notification is a notification indicating that the state of the power unit 10 is the second limited performance state. The second limited state notification can be performed by displaying the characters, the pictures, and the like and/or outputting the sound. As an example, the second limited state notification may be a notification for displaying the characters such as "motor output is being limited" or outputting the sound in addition to notification of the first limited state notification described above.

Here, the second limited state notification is the notification indicating that the traveling performance of the fuel cell vehicle V is in the more limited state than the first limited state notification in a more emphasized manner. That is, here, the notification in a more emphasized manner may be, for example, displaying more characters and illustrations for display. In addition to this, displaying in a more emphasized manner may be, for example, displaying in a color in which color of the characters and illustrations of the display is more easily recognized or a color that easily draws attention. In addition, displaying in a more emphasized manner may be, for example, increasing sizes of characters and illustrations of the display or increasing luminance. Displaying in a more emphasized manner may be, for example, displaying the characters and illustrations of the display in characters (contents of sentences) and illustrations (patterns) that more easily draws attention. The notification by sound in a more emphasized manner may be, for example, notification with a tone or volume that easily draws attention. The notification by sound in a more emphasized manner may be, for example, notification with voice contents that more easily draws attention. In addition, various forms can be adopted as the notification in a more emphasized manner.

In addition, when the traveling propriety determination unit 22 determines that the fuel cell vehicle V cannot travel, the notification control unit 23 performs a traveling disabled notification indicating that the fuel cell vehicle V cannot travel through the notifier 3. For example, the traveling disabled notification indicates that the fuel cell vehicle V cannot travel because activation of the battery 11 and the like is not completed. The traveling disabled notification can be performed by displaying the characters, the pictures, and the like and/or outputting the sound. As an example, the traveling disabled notification may be a display in which the characters such as "READY" are blinked.

In this manner, the notification control unit 23 performs each notification corresponding to determination results of the state determination unit 21 and the traveling propriety determination unit 22 through the notifier 3.

Here, the traveling propriety determination unit 22 may determine that the state of the fuel cell 12 is the activation delay state. In this case, even when the state determination unit 21 determines that the fuel cell vehicle V is in the limited performance state, the traveling propriety determination unit 22 does not determine that the fuel cell vehicle V can travel. That is, in this case, the limited state notification is not performed. Note that FIG. 2 illustrates a relationship between the presence or absence of the limited state notification and each state of power unit 10 in each case of a normal state and the activation delay state of the fuel cell 12.

Figure 3:
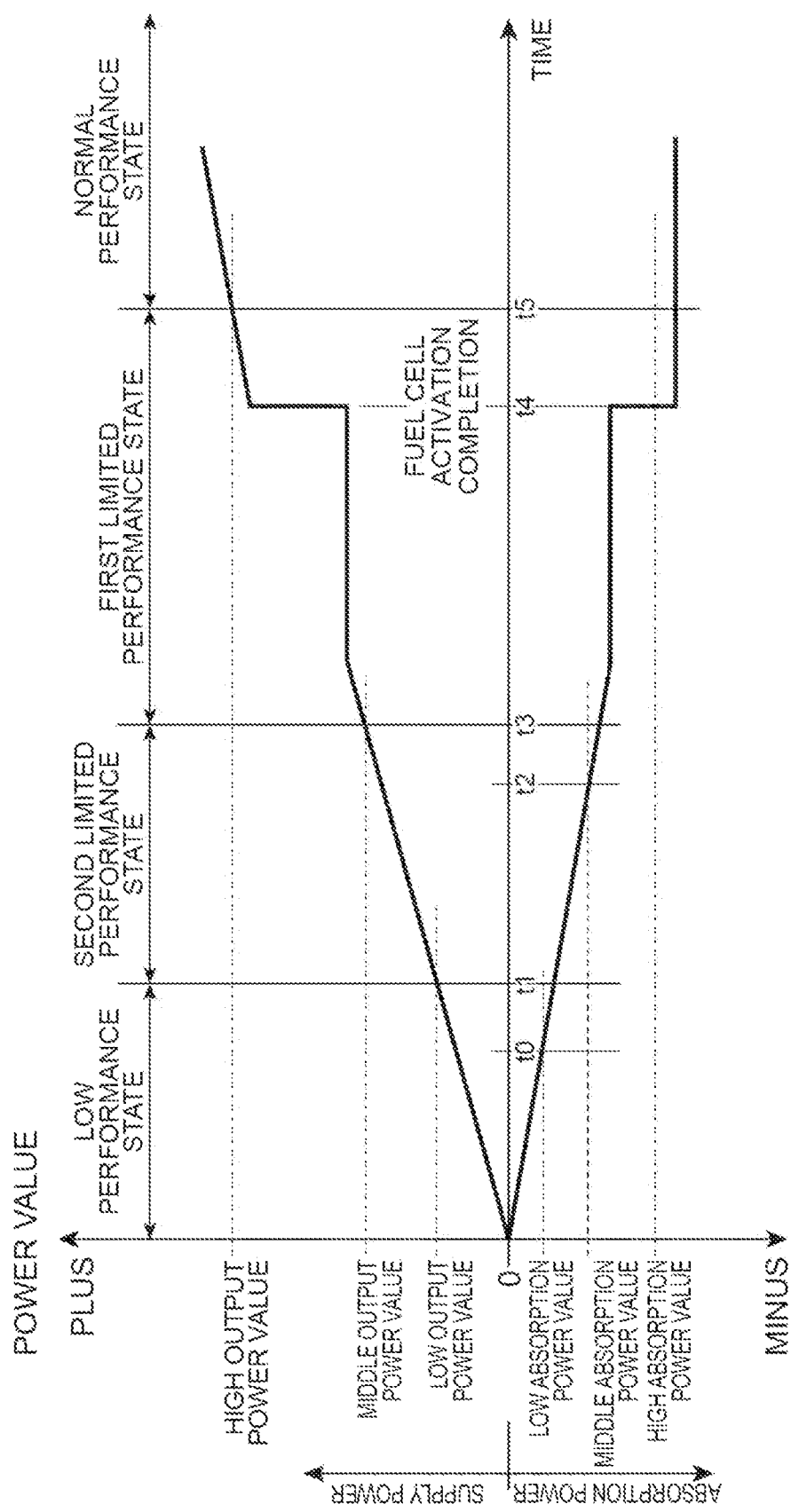
FIG. 3 is a diagram illustrating a relationship between temporal changes in driving performance and braking performance after start of activation of the power unit and each state of the power unit.

Next, a relationship between temporal changes in the driving performance and the braking performance after the start of activation of the power unit 10 and the state of the power unit 10 will be described. Note that the temporal changes in the driving performance and the braking performance illustrated in FIG. 3 are an example. Further, FIG. 3 illustrates a case where the fuel cell 12 is in the normal state (a case where the fuel cell 12 is not in the activation delay state). In the vertical axis of FIG. 3, a "plus" region indicates a power value that can be supplied to the motor 15 as the driving performance. In the vertical axis of FIG. 3, a "minus" region indicates a power value that can be absorbed by the battery 11 and the brake register 13 as the braking performance. Note that in the "minus" region of the vertical axis in FIG. 3, the smaller the power value (the greater the minus degree), the larger the absorption power of the battery 11 and the like.

Further, in the example illustrated in FIG. 3, the brake register 13 can exhibit predetermined power absorption performance by, for example, being supplied with cooling water. The cooling water cools the brake register 13 that generates heat by absorbing the electric power. Further, the cooling water is supplied to brake register 13 when the activation of fuel cell 12 is completed. That is, in the example illustrated in FIG. 3, the brake register 13 can exhibit the predetermined power absorption performance when the activation of fuel cell 12 is completed.

As illustrated in FIG. 3, when the activation of the power unit 10 starts, the activation of the battery 11 and the fuel cell 12 starts. By activating the battery 11, the power value that can be supplied to the motor 15 gradually increases as the driving performance. Further, by activating the battery 11, the power value that can be absorbed by the battery 11 gradually increases.

Thus, at time t0, the power value that can be absorbed by the battery 11 is equal to or more than the low absorption power value. Thereafter, at time t1, the power value that can be output from the battery 11 is equal to or more than the low output power value. That is, the state determination unit 21 determines that the power unit 10 is in the low performance state until time t1. Then, at time t1, the state determination unit 21 determines that the power unit 10 is in the second limited performance state.

Thereafter, at time t2, the power value that can be absorbed by the battery 11 is equal to or more than the middle absorption power value. Thereafter, at time t3, the power value that can be output from the battery 11 is equal to or more than the middle output power value. Thus, at time t3, the state determination unit 21 determines that the power unit 10 is in the first limited performance state.

Thereafter, when the activation of the fuel cell 12 is completed at time t4, the power value that can be supplied to the motor 15 by the battery 11 and the fuel cell 12 greatly increases. Then, at time t4, since the cooling water is supplied to the brake register 13, the power value that can be absorbed by the battery 11 and the brake register 13 greatly increases. Thus, at time t4, the power value that can be absorbed by the battery 11 and the brake register 13 is equal to or more than the high absorption power value. Thereafter, at time t5, the power value that can be supplied to the motor 15 is equal to or more than the high output power value. Thus, at time t5, the state determination unit 21 determines that the power unit 10 is in the normal performance state.

Note that in the example illustrated in FIG. 3, the brake register 13 can exhibit the predetermined power absorption performance when the activation of fuel cell 12 is completed. The configuration of the brake register 13 is not limited to this, and may be a configuration that exhibits the predetermined power absorption performance at a timing other than time t4.

As described above, the traveling propriety determination device 1 determines that the fuel cell vehicle V can travel even in the limited performance state in which the traveling performance is lower than that in the normal performance state. Thus, for example, even in a state where the activation of the fuel cell 12 is not completed, the fuel cell vehicle V can travel in anticipation of completion of the activation of the fuel cell 12. However, when the traveling propriety determination device 1 determines that the fuel cell vehicle V can travel in the limited performance state, the traveling propriety determination device 1 performs the limited state notification (the first limited state notification or the second limited state notification) indicating that the traveling performance is in the limited state. Thus, the driver of the fuel cell vehicle V can recognize that the fuel cell vehicle V can travel but the traveling performance is in the limited state. Then, the driver can perform a driving operation according to limited traveling performance. In this manner, the traveling propriety determination device 1 can more appropriately determine the traveling propriety of the fuel cell vehicle V and notify the traveling performance of the fuel cell vehicle V.

Further, the limited performance state determined by the state determination unit 21 includes the first limited performance state and the second limited performance state in which the traveling performance is lower than that in the first limited performance state. When the state determination unit 21 determines that the fuel cell vehicle V is in the first limited performance state and the traveling propriety determination unit 22 determines that the fuel cell vehicle V can travel, the notification control unit 23 performs the first limited state notification as the limited state notification through the notifier 3. When the state determination unit 21 determines that the fuel cell vehicle V is in the second limited performance state and the traveling propriety determination unit 22 determines that the fuel cell vehicle V can travel, the notification control unit 23 performs the second limited state notification as the limited state notification through the notifier 3. In this case, the traveling propriety determination device 1 can perform the first limited state notification or the second limited state notification according to the traveling performance in the limited performance state even in the limited performance state. Thus, the driver can recognize how much the traveling performance is limited although the fuel cell vehicle V can travel.

Note that the second limited state notification performed by the notification control unit 23 is the notification indicating that the traveling performance of the fuel cell vehicle V is in the more limited state than the first limited state notification in a more emphasized manner. In this case, the driver can easily distinguish and recognize the first limited state notification and the second limited state notification.

The traveling performance of the fuel cell vehicle V determined by state determination unit 21 includes both the driving performance and the braking performance of fuel cell vehicle V. In this case, the traveling propriety determination device 1 can determine the traveling propriety of the fuel cell vehicle V based on the driving performance and/or the braking performance that can be exhibited by the power unit 10.

When the traveling propriety determination unit 22 determines that the fuel cell vehicle V can travel, the notification control unit 23 performs the travel enabled notification indicating that the fuel cell vehicle V is in the travelable state through the notifier 3. In this case, the driver can easily recognize that the fuel cell vehicle V is in the travelable state.

The traveling propriety determination unit 22 can determine whether the state of the fuel cell 12 is the activation delay state that requires the preset time or more for activating the fuel cell 12. Then, even when the state determination unit 21 determines that the fuel cell vehicle V is in the limited performance state, the traveling propriety determination unit 22 does not determine that the fuel cell vehicle V can travel. Thus, when the fuel cell 12 is in the activation delay state, the traveling propriety determination device 1 does not determine that the fuel cell vehicle V can travel until the power unit 10 is in the normal performance state. That is, the traveling propriety determination device 1 does not determine that the fuel cell vehicle V can travel, for example, in anticipation of the completion of the activation when the activation of the fuel cell 12 is not completed. In this manner, the traveling propriety determination device 1 can more appropriately determine the traveling propriety of the fuel cell vehicle V based on the state of the fuel cell 12.

Although the embodiments of the present disclosure have been described above, the present disclosure is not limited to the above embodiments. For example, in the above embodiments, when determining the traveling performance that can be exhibited by the power unit 10, the state determination unit 21 performs the determination in consideration of both the driving performance and the braking performance. The present disclosure is not limited thereto, and the state determination unit 21 may perform the determination using only one of the driving performance and the braking performance when determining the traveling performance that can be exhibited by the power unit 10.

Further, the limited performance state determined by the state determination unit 21 may not include two states of the first limited performance state and the second limited performance state.

In the above embodiments, a case where the power generated by the motor 15 when the motor 15 is used as the regenerative brake can also be absorbed by the brake register 13 has been described. That is, the brake register 13 functions as the braking electric power absorption device that absorbs the power generated by the motor 15. However, the braking electric power absorption device is not limited to the brake register 13. In the above embodiments, another braking electric power absorption device may be used instead of the brake register 13.

What is claimed is:

1. A traveling propriety determination device that determines whether a fuel cell vehicle can travel in the fuel cell vehicle that travels by power of a power unit including a battery, a fuel cell, and a motor operated by electric power of at least one of the battery and the fuel cell, the traveling propriety determination device comprising:
a state determination unit configured to determine, based on a state of the power unit, whether a state of traveling performance of the fuel cell vehicle that can be exhibited by the power unit is a predetermined normal performance state in which the fuel cell vehicle can normally travel, a limited performance state in which the traveling performance is lower than that in the normal performance state, or a low performance state in which the traveling performance is lower than that in the limited performance state;
a traveling propriety determination unit configured to determine that the fuel cell vehicle can travel when the state determination unit determines that the fuel cell vehicle is in the normal performance state or the limited performance state; and
a notification control unit configured to perform a limited state notification indicating that the traveling performance of the fuel cell vehicle is in a limited state through a notifier when the state determination unit determines that the fuel cell vehicle is in the limited performance state and the traveling propriety determination unit determines that the fuel cell vehicle can travel.

2. The traveling propriety determination device according to claim 1, wherein
the limited performance state includes a first limited performance state and a second limited performance state in which the traveling performance is lower than that in the first limited performance state,
the state determination unit determines whether the state of the traveling performance that can be exhibited by the power unit is the normal performance state, the first limited performance state, the second limited performance state, or the low performance state,
the notification control unit performs a first limited state notification as the limited state notification through the notifier when the state determination unit determines that the fuel cell vehicle is in the first limited performance state and the traveling propriety determination unit determines that the fuel cell vehicle can travel, and
the notification control unit performs, as the limited state notification, a second limited state notification indicating that the traveling performance of the fuel cell vehicle is lower than that of the first limited performance state through the notifier when the state determination unit determines that the fuel cell vehicle is in the second limited performance state and the traveling propriety determination unit determines that the fuel cell vehicle can travel.

3. The traveling propriety determination device according to claim 2, wherein the second limited state notification is a notification indicating that the traveling performance of the fuel cell vehicle is in a more limited state than the first limited state notification in a more emphasized manner.

4. The traveling propriety determination device according to claim 1, wherein
the traveling performance is driving performance or braking performance of the fuel cell vehicle, or includes both the driving performance and the braking performance of the fuel cell vehicle, and
the braking performance indicates power absorption performance when power generated by the motor when the motor is used as a regenerative brake is absorbed by at least one of the battery and a braking electric power absorption device mounted on the fuel cell vehicle.

5. The traveling propriety determination device according to claim 1, wherein when the traveling propriety determination unit determines that the fuel cell vehicle can travel, the notification control unit performs a travel enabled notification indicating that the fuel cell vehicle is in a travelable state through the notifier.

6. The traveling propriety determination device according to claim 1, wherein
the traveling propriety determination unit determines whether a state of the fuel cell is an activation delay state requiring a preset time or more for activating the fuel cell, and
when the state of the fuel cell is the activation delay state, even if the state determination unit determines that the fuel cell vehicle is in the limited performance state, the traveling propriety determination unit does not determine that the fuel cell vehicle can travel.

* * * * *